Feb. 8, 1944.  J. McD. IDE  2,341,323
GRAVITY METER
Filed April 21, 1942  2 Sheets-Sheet 1
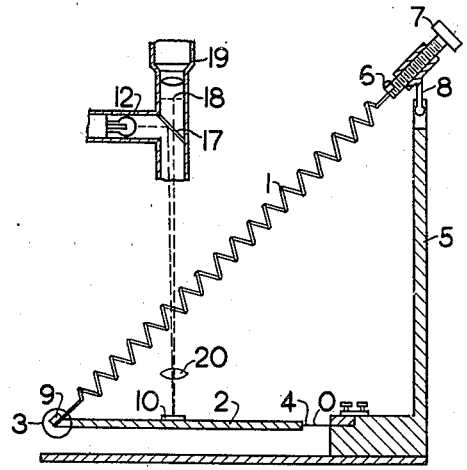
Fig. I
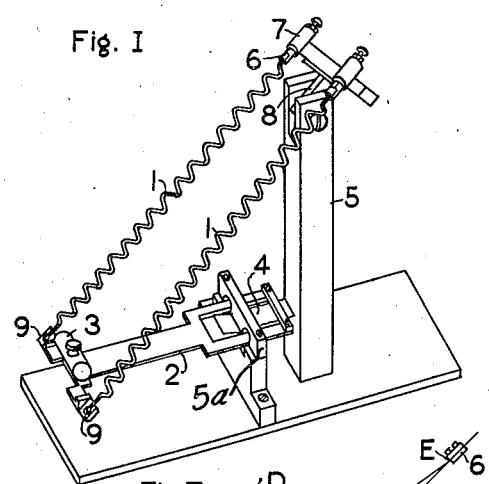
Fig. II
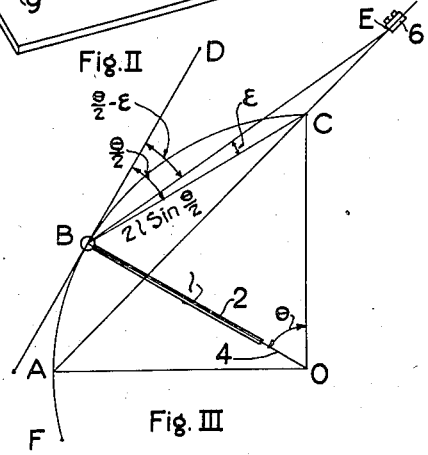
Fig. III
Inventor: John M. Ide
By His Attorney:

Feb. 8, 1944.   J. McD. IDE   2,341,323
GRAVITY METER
Filed April 21, 1942   2 Sheets-Sheet 2
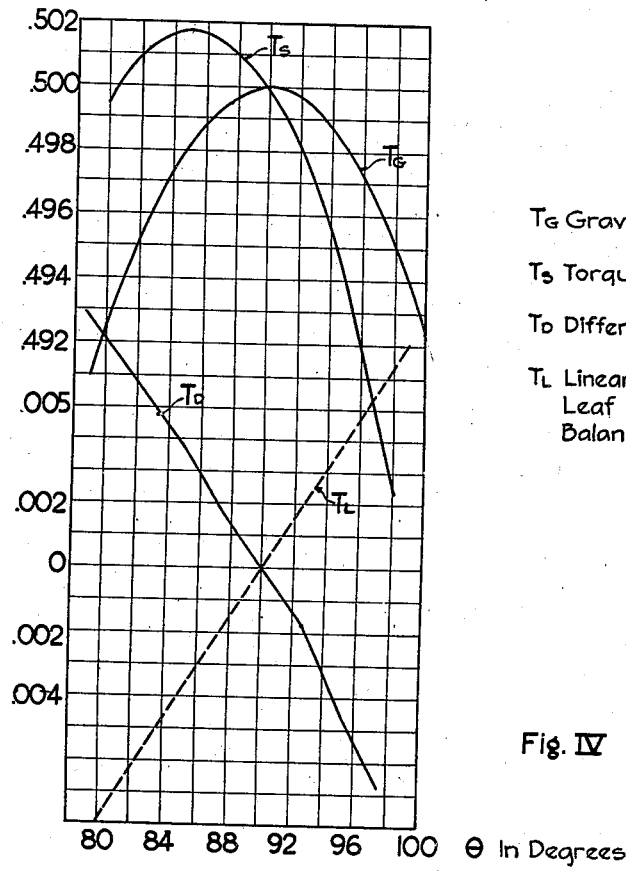
$T_G$ Gravity Torque $\propto \frac{1}{2} \sin \theta$
$T_S$ Torque From Main Spring
$T_D$ Difference Between $T_S$ & $T_G$
$T_L$ Linear Torque Supplied By Leaf Spring Designed To Balance 3
Fig. IV
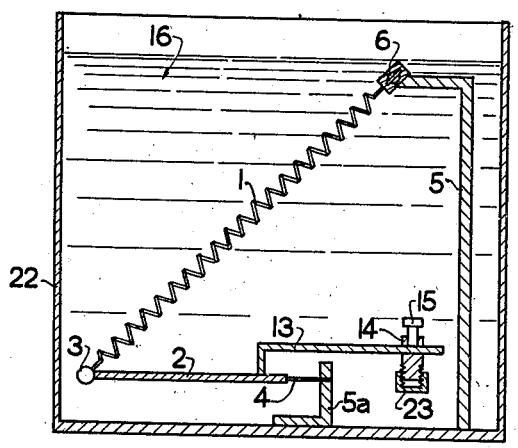
Fig. V
Inventor: John M. Ide
By His Attorney:

Patented Feb. 8, 1944

2,341,323

UNITED STATES PATENT OFFICE 2,341,323

GRAVITY METER

John McDonald Ide, Alexandria, Va., assignor to Shell Development Company, San Francisco, Calif., a corporation of Delaware Application April 21, 1942, Serial No. 439,808

6 Claims. (Cl. 265—1.4)

This invention relates to improvements in gravity meters of the type in which the effect of the force of gravity on a pivoted beam is balanced by one or more springs, and the displacement of said beam provides a measure of the force of gravity.

It is an object of this invention to provide a device in which a weight fixedly attached to one end of a beam or rigid member is supported and balanced by one or more springs in such a manner as to respond to small changes in gravitational acceleration by a readable displacement of the weighted end of the beam.

It is also an object of this invention to provide an improved gravity meter in which knife edge pivots are eliminated, and in which the means connecting the movable beam to a fixed support is a resilient or elastic coupling device, such as one or more thin leaf springs.

It is also an object of this invention to provide a gravity meter in which an elastic member, such as a leaf spring, simultaneously serves as a coupling device for the movable beam, and as means for securing high sensitivity to gravitational changes over a relatively wide range of displacements of the beam's end.

It is also an object of this invention to provide an improved gravity meter in which helical springs wound in the ordinary manner and having appreciable axial length when unstressed, may be used in conjunction with an elastic coupling between the beam and its support to provide high sensitivity over a wide range of gravitational changes, thereby eliminating the necessity of using so-called zero-length spiral springs.

It is also an object of this invention to provide a gravity meter adapted to be totally immersed in an inert liquid, whereby all the moving parts thereof may be conveniently damped without introducing stray fields, the necessity of corrections for barometric pressure changes is eliminated, and linear temperature effects may be compensated for, as described hereinbelow.

These and other objects of this invention will be understood from the following description, taken with reference to the attached drawings, wherein:

Fig. 1 is a diagrammatic cross-section view of the present gravity meter and of the optical system used therewith;

Fig. 2 is a perspective view of a slightly modified embodiment of said gravity meter;

Fig. 3 is a force and angle diagram of the operation of said gravity meter;

Fig. 4 is a graph of torque variations involved in the operation of the present gravity meter;

Fig. 5 is a diagrammatic cross-section view of another embodiment of the present gravity meter adapted for immersion in a damping liquid.

Referring to Figs. 1 and 2, a beam 2, which is preferably constructed of a light material, such as aluminum, has rigidly connected thereto at one end a weight 3, and is clamped at the opposite end to a thin leaf spring 4. The other end of the leaf spring 4 is clamped to a rigid supporting member 5, which may in turn be clamped to, or may form part of the base of the apparatus.

A gravitational torque is produced by the weight 3 about a center line O of the spring 4, which line may be defined as a line perpendicular to the longitudinal axis of the beam 2 passing in the horizontal plane of the flat spring 4 at substantially equal distances from the points where the spring 4 is respectively clamped to the beam 2 and the member 5.

This gravitational torque is balanced by the pull of a helical spring 1, made of a material having an extremely high elastic stability, such as elinvar or quartz. The spring 1 is attached to the weighted end of the beam 2 by means of a clamp 9, and to the support 5 by means of a clamp 6 in such a manner as to exert a pull on the beam 2 at an angle of 45° when the beam 2 is in a horizontal position. Mechanical means, such as calibrated screws 7, are provided for displacing the clamps 6 to adjust the tension of the spring 1 and the position of its upper end over a suitable range, for example, 1 cm. for a beam of 10 cm. length. Further means, such as shown at 8, in Figs. 1 and 2 and which may comprise a slot and pivot arrangement, are provided for adjusting the angle between the line of spring tension and the axis of the beam 2 to a value of approximately 45 degrees when the beam is in a horizontal or working position.

If the spring 4 is selected of a thinness such that it may become subject to buckling if held in compression between the beam 2 and the support 5, as shown in Fig. 1, an alternative method of mounting said spring, such as shown in Fig. 2, may be used. In this case, the spring 4 and the beam 2 are clamped together at their ends opposite the one supporting the weight 3, while a supporting member 5a, attached to the base, or integral therewith, is clamped to the spring 4 at a point intermediate the two ends of the beam 2, whereby the spring 4 supports the beam 2 while being subjected to stress in tension.

The optical system of the gravity meter may consist of any desired conventional arrangement, such as a microscope for observing and measuring the motion of the beam's end, or a simple optical lever in which the rays of a straight lamp filament are rendered parallel by a lens, reflected by a mirror fastened to the moving beam 2, and the reflected image focused on a calibrated scale which is observed through a suitable eyepiece. Such an optical lever is shown in Fig. 1, wherein the light from a straight lamp filament 12 is reflected from a semi-transparent mirror 17, and is directed, through a lens 20, which renders the rays parallel to a mirror 10 attached to the beam 2. After reflection from the mirror 10, the light passes again through lens 20 and the semi-transparent mirror 17, and is focused on a screen 18 where it is viewed through an eyepiece 19.

The principles according to which the present gravity meter operates under high sensitivity conditions will be explained with regard to Fig. 3, which is a diagram indicating the disposition of forces and angles relating to the elements of the device shown in Figs. 1 and 2.

The arc of a circle FABC is defined by the locus of the center of gravity of the weight 3 as the beam turns about an axis through O, as hereinabove defined with regard to Figs. 1 and 2.

The radius OA of this circle is the effective length of the beam 2. The line OB, making an angle $\theta$ with the vertical represents one position of the beam 2, which is preferably operated in the neighborhood of OA, in which case $\theta$ is substantially 90 degrees. It will be understood that when the force of gravity increases, the torque of the weight 3 about the midpoint O of the spring 4 increases and causes the beam to rotate in a counterclockwise direction, increasing the angle $\theta$ and carrying the weight 3 along the arc from position B towards positions A and F. The line OC is a vertical line passing through O, and the line BD is perpendicular to OB.

When the beam 2 is in the position OB, making an angle $\theta$ with the vertical, the gravitational torque $T_g$ is given by the expression $T_g = Mgl \sin \theta$, where M is the mass of the weight 3, $l$ is the effective length of the beam 2, and $g$ is the acceleration due to gravity. In order to make the device sensitive to small changes in gravitational force, the torque produced by the pull of the spring must be designed to be closely equal in magnitude and opposite in direction to the gravitational torque; the closer the balance of the opposing torques, the higher the sensitivity of the device.

To meet practical requirements such as the adjustment of springs and clamps, and the calibration of scales covering a reasonable range, it is advantageous to maintain high gravity sensitivity over a range of several degrees, as the weight 3 moves along the arc BAF.

In order, furthermore, that a linear, or a near-linear scale of readings may be obtained, the sensitivity of the apparatus must not change over said range. The sensitivity S of the system expressed by the equation $$S = g \frac{d\theta}{dg}$$

wherein sensitivity factor S should preferably have a value of 100 or more.

The linearity of the system is expressed by the equation $$L = \frac{d^2\theta}{dg^2} = \frac{dS}{dg}$$

It will therefore be seen that the present device may be given linear characteristics by satisfying the equation $$\frac{d^2\theta}{dg^2} = \frac{dS}{dg} = 0$$

which indicates the condition under which the sensitivity factor will remain constant as $g$ and $\theta$ change. Linear characteristics in a gravity meter are highly desirable, since the calibration and operation of devices with non-linear or experiential characteristics are extremely difficult.

Since, as seen from the expression $T_g = Mgl \sin \theta$, the gravitational torque follows a sinusoidal curve, the springs of the present device must be arranged so that the spring torque follows a closely similar curve over a range of several degrees to give an equal and opposite effect. The spring torque depends upon two factors: a force factor proportional to the extension of the spring, and an angle factor which determines the component of the force acting to produce a torque about 0. It is obvious that the component of the spring force acting along the beam tends to compress said beam without affecting the magnitude of the torque.

Assume now that the extension of the spring under the effect of an increase of the force of gravity is made proportional to the distance BC in Fig. 3, that is, to the distance between the beam's end and the point where a vertical line passing through O cuts the circle described by the beam's end.

Since $$BC = 2l \sin \frac{\theta}{2}$$

and since the angle factor is $$\cos \frac{\theta}{2}$$

the spring torque will in such case be equal to $$2KL \sin \frac{\theta}{2} \cos \frac{\theta}{2}$$

where K is the constant of the spring. From trigonometry, $$2 \sin \frac{\theta}{2} \cos \frac{\theta}{2} = \sin \theta$$

so that the torque exerted by the spring will be $T_s = Kl \sin \theta$. If the constants are selected so that $K = Mg$, it is clear that the spring torque will exactly balance the gravitational torque, and the instrument will theoretically be infinitely sensitive and perfectly linear for all values of $\theta$, since both torques vary with $\theta$ as the same function thereof, namely, $\sin \theta$.

The above discussion relating to an ideal case, the practical problem of the present invention is to provide a gravity meter in which the same relations hold closely enough to give the desired degree of accuracy.

This may be effected by placing the upper clamp 6 at E, on the projection of the line AC connecting the beam's end, when in a horizontal position, with the point C where a vertical line passing through O cuts the circle described by the beam's end. The point E is selected so that the distance CE is equal to the length of the spring when the latter is unstressed or stressed only by its own weight, that is, the weight of its coils.

Thus, when the beam is in a position OA, with the spring clamped between the points A and E, the extension of the spring due to the weight of the beam will be $$AE - CE = AC = 2l \sin \frac{\theta}{2}$$

as desired, and the angle factor $$\left(\cos \frac{\theta}{2}, \text{ where } \frac{\theta}{2} = 45 \text{ degrees}\right)$$

will also satisfy the conditions set up above.

As the beam is displaced from this position, for example, to a position OB, the extension of the spring will be only slightly less than the desired value of BC, while the angle between the beam and the direction of the spring pull will differ from the desired value by an angle $\epsilon$. The effect of the added angle $\epsilon$ is such that the spring torque is larger than the gravity torque when $\theta$ is less than 90 degrees, and smaller than the gravity torque when $\theta$ is greater than 90 degrees.

Fig. 4 is a graph illustrating the relative values of the spring torque $T_s$ and the gravity torque $T_g$ as the angle $\theta$ varies in the range from 80 to 100 degrees, which is a sufficient range for a practical instrument. The difference between the torques is shown in Fig. 4 by the curve $T_D$.

According to the present invention, this difference in torques is substantially neutralized by means of an equal and opposite torque which varies in the manner shown at $T_L$ in Fig. 4. A convenient means of adding such a torque resides in the coupling of the beam 2 to the support 5 by means of the thin leaf spring 4. It is obvious that such a leaf spring will develop a torque which will assist the gravity torque when $\theta$ is less than 90 degrees, will be equal to zero when $\theta$ is equal to 90 degrees, and will oppose the gravity torque when $\theta$ is more than 90 degrees. Although this leaf spring torque is a linear function of $\theta$, and although the difference between the gravity and the coil spring torques, as shown by curve $T_D$ in Fig. 4, does not vary in a perfectly linear manner, the compensation effected by the added linear torque $T_L$ is so nearly perfect that it will be fully effective to produce an instrument of improved accuracy and sensitivity characteristics, capable of being quickly adjusted to give readings with a precision of one-tenth of a milligal or better.

Either the leaf spring 4 of the helical spring 1, or both, may be used in the form of several parallel springs to render the system more stable against spurious motions, such, for example, as a rotational motion about the longitudinal axis of the beam 2, as shown in Fig. 2 with regard to the spring 1.

Since the level sensitivity of a gravity meter is an important consideration from a practical standpoint, it is preferable to use instruments which do not require levelling to a precision greater than that obtainable with a forty or sixty second spirit level. Greater precision than this requires either an extremely stable foundation, or a suspension arrangement to reduce the sensitivity of the meter to levelling. The present gravity meter has a level sensitivity proportional to $(l - \sin \theta)$. Thus, in a region where $\theta$ is approximately 90 degrees and the beam is nearly horizontal, the level sensitivity is small, approaching zero as $\theta$ approaches 90 degrees. When $\theta = 89$ degrees, the level sensitivity is about 3 milligals for a level shift of one minute of arc. It is therefore clear that it is preferable to operate the gravity meter in such a manner that the angle $\theta$ differs 90 degrees by less than one degree of arc.

The present gravity meter may be compensated for linear thermal effects by making use of the buoyant force of an inert liquid in which the instrument may be immersed.

Referring to Fig. 5, which shows an embodiment of the present invention in general similar to that of Fig. 2, the beam 2 is provided with an elongated member 13 attached thereto and extending to the other side of a vertical plane passing through the line O. The member 13 carries a counterweight 14 made of a relatively light material, such, for example, as Bakelite, Celluloid, etc., whose position along the member 13 may be adjustably varied by suitable means such as a set screw 15. The volume of the counterweight 14 may likewise be adjusted to different desirable values, for example, by means of a hollow internally screw-threaded cap 23 attached to the counterweight 14. The whole instrument is immersed in a suitable liquid 16, held in a housing 22. The buoyant force of the liquid upon the beam may be made to produce a torque either aiding or opposing the gravity torque by properly selecting or adjusting the volume of the counterweight 14 or its position along the beam 13. The buoyant force exerted by the liquid will vary with the temperature, since the thermal expansion of the liquid will cause its specific gravity to decrease as the temperature increases. The torque on the beam 2 about the pivot point O may thus be made to vary with temperature in any desired manner by adjusting the volume 14 and its position along the beam 13. In particular, the variation of the torque with temperature may be completely compensated for, so that the gravity meter is no longer sensitive to temperature changes of the first order. Care should be taken to eliminate temperature gradients and other thermal effects of a higher order in order to utilize the pesent method of thermal compensation under optimum conditions.

I claim as my invention:

1. A gravity meter comprising a base provided with an upright member, a substantially horizontal beam weighted at one end, a resilient member connecting the other end of said beam to said base for pivotal movement about a horizontal axis passing through said resilient member at right angles to the axis of the beam, a coil spring attaching the weighted end of the beam to a point on said upright member located above said beam, said point and the weighted end of the beam being located on opposite sides of a vertical plane passing through the pivotal axis, the axial length of said coil spring when unstressed being equal to the distance between said point and said plane measured along a line drawn between the two attachment points, and means for observing the motion of the beam under the effect of the force of gravity.

2. The apparatus of claim 1, comprising clamping means attaching the coil spring to the beam, clamping means attaching the coil spring to the upright member, means for adjusting the tension of said spring between said clamping means, and means for adjusting the position of the clamping means on the upright member of the base.

3. A gravity meter comprising a base provided with an upright member, a substantially horizontal beam weighted at one end, a leaf spring clamped to said beam at the other end thereof and extending towards the weighted end of the beam, means for clamping said spring to said base, whereby said beam is pivoted about a horizontal axis passing through said spring at right angles to the axis of the beam intermediate the two clamping points, a coil spring attaching the weighted end of the beam to a point on said upright member located above said beam, said point and the weighted end of the beam being located on opposite sides of a vertical plane passing through the pivotal axis, the axial length of said coil spring when unstressed being equal to the distance between said point and said plane measured along a line drawn between the two attachment points, and means for observing the motion of the beam under the effect of the force of gravity.

4. A gravity meter comprising a base provided with an upright member, a substantially horizontal beam weighted at one end, a resilient member connecting the other end of said beam to said base for pivotal movement about a horizontal axis passing through said resilient member at right angles to the axis of the beam, a plurality of lower clamping means on the beam adjacent the weighted end thereof, said means being spaced from each other along a horizontal line transverse to the axis of the beam, a plurality of corresponding upper clamping means on the upright member of the base above said beam, said two sets of clamping means being located on opposite sides of a vertical plane passing through the pivotal axis of the beam, a plurality of parallel coil springs held between said lower and said upper clamping means, the axial length of each of said springs when unstressed being equal to the distance between its upper clamp and the vertical plane passing through the pivotal axis of the beam, said distances being measured along lines drawn between the lower and the upper clamps, and means for observing the motion of the beam under the effect of the force of gravity.

5. A gravity meter comprising a liquid-filled housing, and a gravity measuring device immersed therein, said device comprising a base provided with an upright member, a beam having a weight at one end and a counterweight at the other end, means for adjusting the location of said counterweight on said beam, a resilient member to support said beam on said base for pivotal movement in a vertical plane, a coil spring attaching the weight-carrying end of said beam to a point on the upright member located above said beam, said point and the weighted end of the beam being on opposite sides of a vertical plane passing through the pivotal point of the beam at right angles to the axis of the beam, the axial length of said spring when unstressed being equal to the distance between said point and said plane measured along a line drawn between the two attachment points, and means for observing the motion of the beam under the effect of the force of gravity.

6. A gravity meter comprising a liquid-filled housing, and a gravity measuring device immersed therein, said device comprising a base provided with an upright member, a beam having a weight at one end and a counterweight at the other end, means for adjusting the location of said counterweight on said beam, means for adjusting the volume of said counterweight, a resilient member to support said beam on said base for pivotal movement in a vertical plane, a coil spring attaching the weight-carrying end of said beam to a point on the upright member located above said beam, said point and the weighted end of the beam being on opposite sides of a vertical plane passing through the pivotal point of the beam at right angles to the axis of the beam, the axial length of said spring when unstressed being equal to the distance between said point and said plane measured along a line drawn between the two attachment points, and means for observing the motion of the beam under the effect of the force of gravity.

JOHN McDONALD IDE.